US006563836B1

(12) United States Patent
Capps et al.

(10) Patent No.: US 6,563,836 B1
(45) Date of Patent: May 13, 2003

(54) ALGORITHM FOR DYNAMIC PRIORITIZATION IN A QUEUING ENVIRONMENT

(75) Inventors: Christopher Louis Capps, Raleigh, NC (US); Gregory Covert Smith, Durham, NC (US); Jay Douglas Stouffer, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/170,300

(22) Filed: Oct. 13, 1998

Related U.S. Application Data

(60) Provisional application No. 60/078,531, filed on Mar. 19, 1998.

(51) Int. Cl.[7] .................... H04L 12/58; G06F 15/167; G06F 9/00
(52) U.S. Cl. .................... 370/412; 370/429; 709/215; 709/328; 711/173
(58) Field of Search ............................. 370/412, 429; 707/100; 709/213, 214, 215, 236, 328; 711/154, 173

(56) References Cited

U.S. PATENT DOCUMENTS

| 4,965,716 A | * | 10/1990 | Sweeney ................. 364/200 |
| 5,212,778 A | | 5/1993 | Dally et al. |
| 5,303,382 A | * | 4/1994 | Buch et al. ............... 395/725 |
| 5,333,269 A | | 7/1994 | Calvignac et al. |
| 5,367,681 A | * | 11/1994 | Foss et al. ................ 395/650 |
| 5,521,916 A | | 5/1996 | Choudhury et al. |
| 5,860,149 A | * | 1/1999 | Fiacco et al. ............. 711/209 |
| 6,145,059 A | * | 11/2000 | Arimilli et al. ........... 711/143 |
| 6,246,683 B1 | * | 6/2001 | Connery et al. .......... 370/392 |

* cited by examiner

Primary Examiner—Hassan Kizou
Assistant Examiner—Ahmed Elallam
(74) Attorney, Agent, or Firm—J. Bruce Schelkopf; Bracewell & Patterson LLP

(57) ABSTRACT

A method of queuing messages for communications between computer programs by placing a plurality of messages in a main queue, placing one or more property messages in one or more property queues associated with the main queue and, for each property message, specifying at least one property of a respective message in the main queue and a unique identifier for the respective message. A property name may be specified for a message, or a property value, or some combination of property names and values. An application program interface (API) makes the main queue and the one or more property queues appear as a single priority queue. A message is retrieved from the main queue according to a predefined priority list which includes the at least one property, which can again be a property name, a property value, or some combination of property names and values. The priority list can be dynamically modified. The system can be implemented in an environment where the messages are placed in the queue by a first computer connected to a network, and retrieved by a second computer connected to the network, with the messages being transmitted across the network.

20 Claims, 3 Drawing Sheets

ALGORITHM FOR DYNAMIC PRIORITIZATION IN A QUEUING ENVIRONMENT

CROSS-REFERENCE TO RELATED APPLICATION

This application claims priority from provisional application Ser. No. 60/078,531 filed Mar. 19, 1998.

BACKGROUND OF THE INVENTION

1. Field of the Invention

The present invention generally relates to computer systems, particularly to an improved method of messaging and queuing for communication between application programs, and more specifically to a method of dynamic priority retrieval from a queue by a retrieving application.

2. Description of Related Art

Oftentimes, it is necessary for different computer programs (software applications) to communicate with one another. There are two general categories of such communications—those between different applications, and those between different component programs of a single application. In the latter case, for example, it is commonplace for a business application to be designed as a group of related programs, each of which handles a single, well-defined component of an overall task. Sometimes the programs that make up a business application run in a single environment, such as the OS/2 operating system of International Business Machines Corp. (IBM—assignee of the present invention). Sometimes they run in multiple, unlike environments.

Many businesses go a step further and distribute programs around their data-processing networks, rather than run them all on one processor. For example, a single application could be distributed between an IBM AIX/6000 environment on an IBM RISC System/6000 processor, and an IBM OS/400 environment on an IBM AS/400 processor. There are many advantages in this approach, most of which are related to making better use of resources. However, when a single application is distributed, whether to unlike environments on a single processor or to different nodes of a network, there must be a way of getting the parts of the application to communicate with each other. This communication can be challenging enough when the components of the network are from a single vendor (i.e., when there are no variations in the operating systems being used, and when there's a single communication protocol). The problem is even more challenging when the network components are from a variety of vendors, and multiple communication a protocols are being used.

The interoperability challenge—the challenge of getting programs to communicate across unlike environments—faces many information system managers today. Until recently, connecting disparate systems like this has been a difficult technical task, and getting different technologies to work together across an enterprise can be a nightmare. Ad hoc solutions to link two systems are complex to program, and prove inflexible if the systems need to change with the business. Often the solution adopted is human intervention—people are used to bridge the gap via phone, fax or e-mail. Inevitably, mistakes occur when high volumes of data are re-keyed, pieces of paper are lost or e-mail mysteriously goes astray with no audit trail.

A fundamental business integration approach to dealing with the foregoing problem is known as message queuing. Message queuing provides reliable transfer of information between computer applications, regardless of the type of computer or network. It acts in a way analogous to an administrative assistant managing the in-trays and out-trays on office desks. The assistant can place "high priority" items on top of the piles in these trays, so that they are dealt with first and, if necessary, can check on the safe delivery of important items. Some commercial queuing packages, such as IBM's MQSeries, offer a high-level application program interface (API) which shields programs from the complexities of different operating systems and underlying networks.

A message is mainly a string of bits and bytes (data representing items such as account numbers, account balances, booking requests, names and addresses, images of documents, etc.) that one program wants to send to another. This type data is often called application data. Of course, a message needs to include other information, such as its destination and possibly a return address. This type of data is called the message descriptor. A program sending a message defines the application data and supplies it. Such data can include character strings, bit strings, binary integers, packed-decimal integers, floating-point numbers, etc.

There are generally four types of messages: a "request" message is used by one program to ask another program for something (usually data); a "reply" message is used in response to a request message; a "one-way" message requires no reply, though it can carry data; and a "report" message is used when something unexpected occurs. For example, if the data in a reply message is not usable, the receiving program might issue a report message. Messages are labeled in this way so that the target program can know what's expected of it, without having to examine the message in detail.

A message queue is an area of storage set aside (by a "queue manager") to hold messages on their way from one program to another. FIG. 1 illustrates optional two-way communication between programs using queues. Program A communicates with program B via Queue 1. If Program B needs to communicate with Program A (whether to reply to a request from Program A or for some unrelated reason), it puts a message on Queue 2. Either program can be busy or unavailable at the time a message is put in its queue. Queues can also be set up in a one-to-many relationship, or a many-to-one relationship. A collection of different types of queues can be used to provide complete communications between a particular set of programs.

By default, a message queue works like a physical queue: first in is first out (FIFO). When using a queuing package, however, it is sometimes desirable to pull items out of the queue in priority. Unfortunately, most message queuing packages only allow the priority of a message to set at the moment a message is placed on a queue. It is then impossible to change the priority of a message, and thus the order the messages will be retrieved.

Some queuing packages do allow the setting of a "key" on a message. A receiving process (program) specifies a particular key on its call to get a message from a queue, and only messages with that same key will be returned. This approach may incidentally allow prioritization of messages, but only if the receiving process assigns a high priority to a particular key. If there are no messages with that key, it then looks for its second most important key, etc. However, most queuing software requires that the key on the message and the key in the get call match exactly. This approach eliminates being able to search for categories of keys. Also, the number of keys that a single message can have is very limited, usually only one or two, restricting the manner in which properties of a message can be stored in the keys of a message. It would, therefore, be desirable to devise a method of pulling messages out of a queue with dynamic priority, whereby the process pulling the messages out could be able to describe which types of messages are more important, and the queuing system return those messages in that priority.

SUMMARY OF THE INVENTION

It is therefore one object of the present invention to provide a system allowing improved communications between computer programs or program components.

It is another object of the present invention to provide such a system that uses messages and queuing to enable inter-program communications, particularly between programs residing in different environments.

It is yet another object of the present invention to provide a messaging and queuing system that facilitates dynamic prioritization and handling of messages.

The foregoing objects are achieved in a method of queuing messages for communications between computer programs, generally comprising the steps of placing a plurality of messages in a main queue, placing one or more property messages in one or more property queues associated with the main queue and, for each property message, specifying at least one property of a respective message in the main queue and a unique identifier for the respective message. A property name may be specified for a message, or a property value, or some combination of property names and values. An application program interface (API) makes the main queue and the one or more property queues appear as a single priority queue. In the illustrative embodiment, each property message is a zero-byte message having first and second keys, the at least one property is specified as the first key, and the unique identifier is specified as the second key. The number of properties for a given message can be less than the number of property queues.

A message is retrieved from the main queue according to a predefined priority list which includes the at least one property, which can again be a property name, a property value, or some combination of property names and values. The priority list can be dynamically modified. In the implementation wherein the placing steps are performed by a first computer connected to a network, and the retrieving step is performed by a second computer connected to the network, the plurality of messages are transmitted across the network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
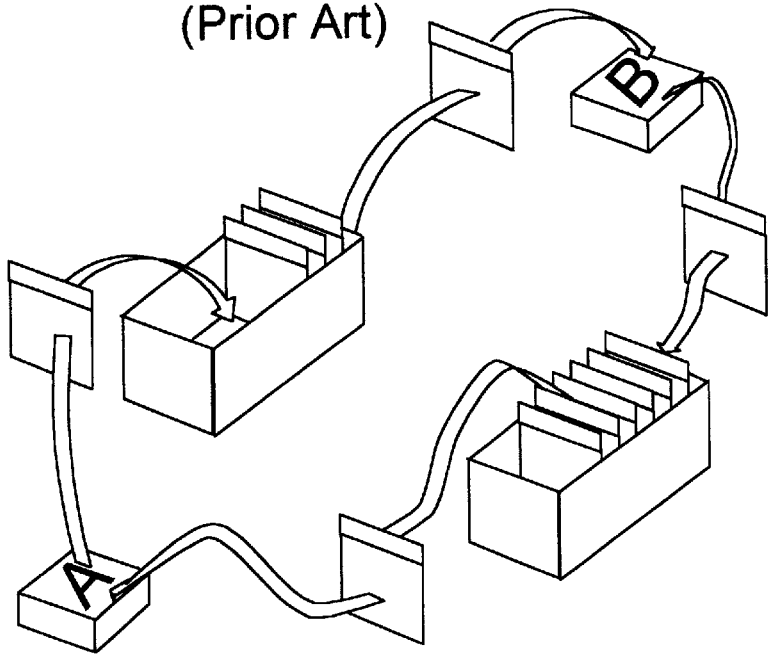
FIG. 1 is a pictorial representation of a conventional messaging and queuing environment allowing communications between two programs.

The present invention is directed to a messaging and queuing system that provides a convenient and reliable method of transmitting information between computer applications/programs, including programs that reside in different environments, e.g., programs running on different operating systems in different computers (clients or servers) that are interconnected by a network. The novel messaging and queuing system provides dynamic prioritization and handling of messages, by utilizing several queues, instead of a single queue, to store a message and any properties that one might want to use for establishing priorities. An application program interface (API) is used to abstract the interaction between these queues so that, to the user, there appears to be only a single, dynamic priority queue.

When there is a request to put a message on the queue, the user of the API specifies each property of the message, as desired. For message retrieval from the dynamic priority queue, the user can predefine a list of properties and property values for the retrieving application, in order of importance. The messages are then returned according to the priority that is specified in the list.

The illustrative embodiment uses a queuing package that allows two keys to be placed on a message, and has unit-of-work capability. There is one main queue and any number of "property" queues. The main queue holds the actual body of the message, and the property queues are used for marking the properties of the message. A separate property queue is used for each category or type of property that a user may desire for establishing priorities. For example, the time zone (e.g., Pacific, Mountain, Eastern, and Central) associated with a message may be a property that the user wants to prioritize by, so a property queue named "TIMEZONE" can be created.

When a message is placed on the dynamic priority queue through the API, a list of properties can be included. For example, the property list may look like the following: "TIMEZONE=EST,TYPE=A,SIZE=LARGE" (EST refers to Eastern Standard Time). The message, along with the list of its properties, is placed on the main queue, with a unique identification number or code (ID). Three zero-byte messages (property messages) are placed on three property queues, the property queues representing respectively TIMEZONE, TYPE, and SIZE. Each of the zero-byte messages has the unique ID given to the original message in the main queue as one key, and the given property value as another key.

When a message is retrieved from a dynamic priority queue through the API, a list of properties used to establish priorities can be included on the method call. An example of a prioritized list of properties is "TYPE=A, TIMEZONE= EST, SIZE." The priority specified by this list would be:

first, return all messages that have the property TYPE=A; then, return all messages that have the property TIMEZONE=EST; then, return all messages that have the property SIZE set to any value; and finally, return any other messages. Any combination of property/value pairs and property names can be created.

In the API, the prioritization list is read, and each property is matched with a property queue. The property messages are retrieved with the property value as the key. In the foregoing example, an attempt to retrieve a property message from the property queue representing TYPE with key "A" is first made and, if that fails, then an attempt to retrieve a property message from the property queue representing TIMEZONE with key "EST" is made. If that attempt also fails, then an attempt is made to retrieve any message from the property queue representing SIZE. If any of the above retrievals are successful, then the unique ID of the original message is extracted from the property message, and the message body represented by that property message is retrieved from the main queue. If none of those searches are successful, then the next sequential message on the main queue is retrieved. All property messages corresponding to this retrieved main message are discarded (deleting the unique message ID key) and the body of the message is returned.

This implementation allows the use of the same value for different properties. For example "TIMEZONE=EST" and "TYPE=EST" are distinguishable. Also, the prioritizing of entire categories of messages is possible, e.g., all messages that have the property TIMEZONE can be retrieved before any messages without said property; in other words, a message can have a number of defined properties which is less than the number of property queues in the dynamic prioritization queue (a message can even have no defined properties).

Figure 2:
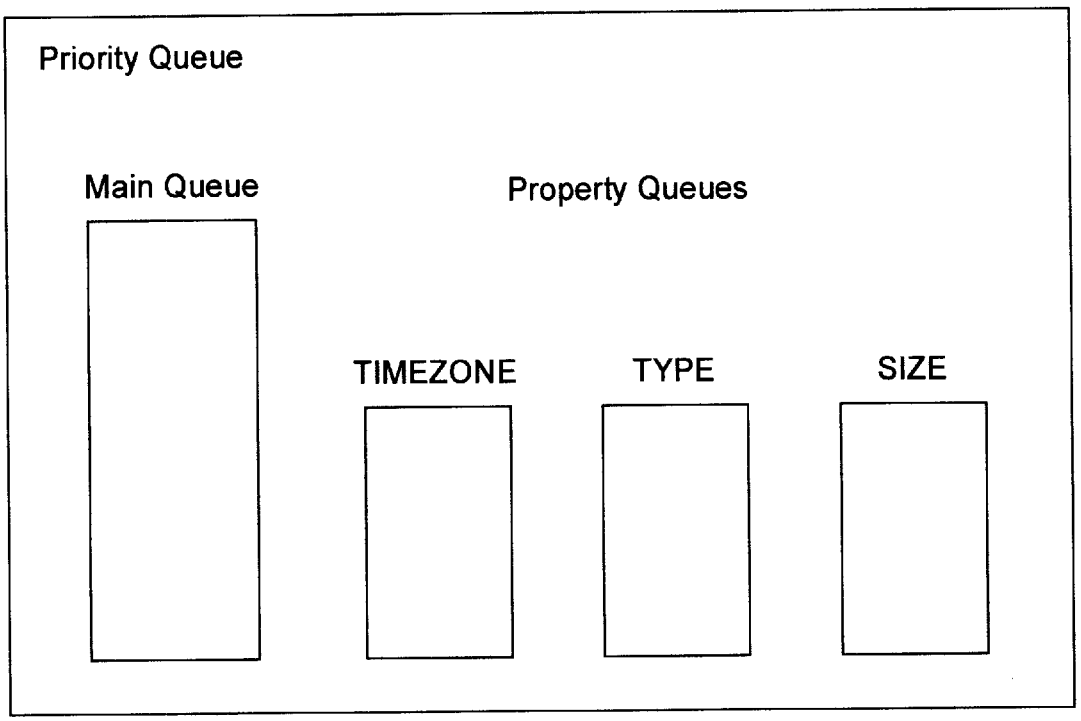
FIG. 2 is a pictorial representation of one example of a messaging environment constructed in accordance with the present invention to provide for dynamic prioritization based on message properties.

With reference now to the figures, and in particular with reference to FIG. 2, there is depicted an example of a dynamic priority queue 10 implemented in accordance with the present invention. Dynamic priority queue 10 allows applications to place work into and pull work out of a plurality of individual queues in the queuing product, which together are abstracted into the single dynamic priority queue. In this embodiment, messages again use at least two keys, and both the process putting items into the queue and the process pulling items from the queue have agreed on a maximum of three properties that can be used for determining the priority of items in dynamic priority queue 10: TIMEZONE, TYPE, and SIZE. The resulting inner components of the priority queue include a main queue 12, a TIMEZONE property queue 14, a TYPE property queue 16, and a SIZE property queue 18.

Figure 3:
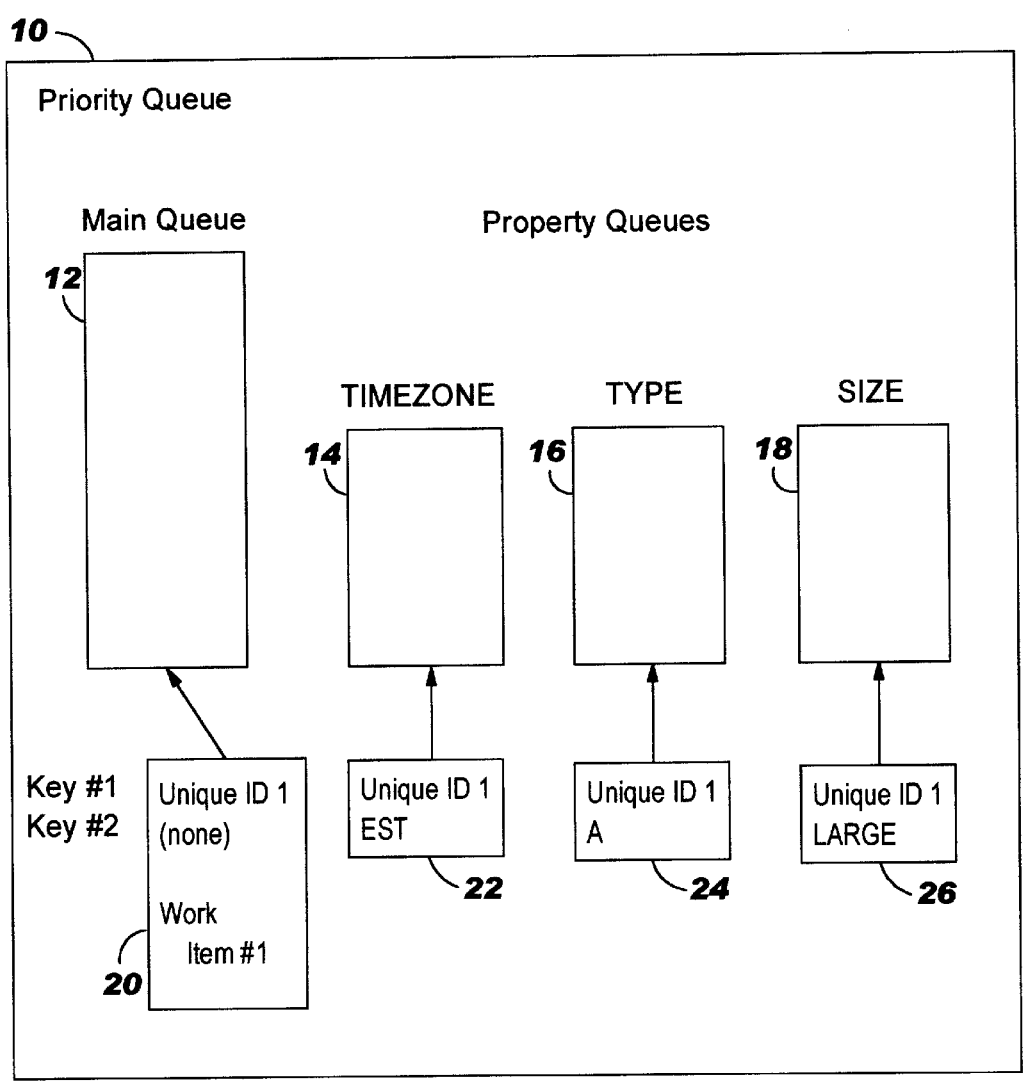
FIG. 3 is a pictorial representation of the messaging and queuing environment of FIG. 2, further depicting the placement of a first message in the dynamic priority queue.

Referring now to FIG. 3, an item of work with the properties of TIMEZONE=EST, TYPE=A and SIZE=LARGE is placed onto dynamic priority queue 10. The item itself (i.e., the body of the item) is packaged into a message 20 and placed on main queue 12 with a unique ID in one of the searchable keys of the message. Then, three zero-byte messages 22, 24 and 26 are placed in each respective property queue 14, 16 and 18, with one key equal to the unique ID that was given to message 20 placed in main queue 12, and one key equal to the value of the respective property.

Figure 4:
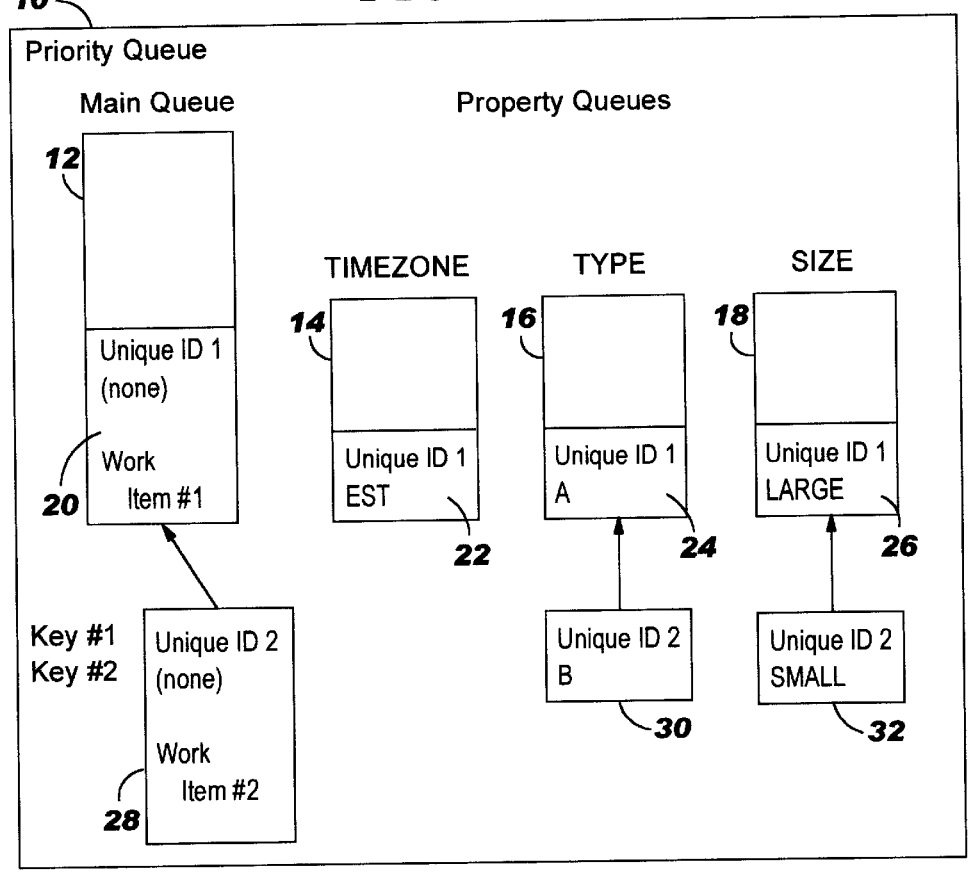
FIG. 4 is a pictorial representation of the messaging and queuing environment of FIG. 2, further depicting the placement of a second message in the dynamic priority queue.

With further reference to FIG. 4, another item is placed into dynamic priority queue 10 with the properties TYPE=B, SIZE=SMALL, and no value for TIMEZONE. Similar to the foregoing item, the body of the second item is packaged into a message 28 and placed on main queue 12 with a unique ID in one of the searchable keys of the message, but this time only two zero-byte messages 30 and 32 are placed in respective property queues 16 and 18, with one key again equal to the unique ID that was given to message 28, and one key equal to the value of the respective property.

Figure 5:
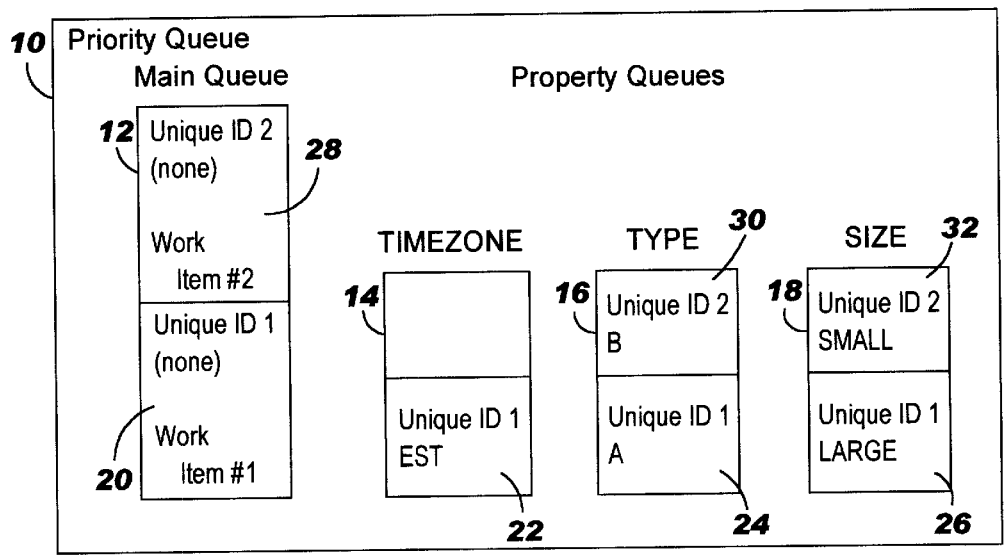
FIG. 5 is a pictorial representation of the messaging and queuing environment of FIG. 2, further depicting the manner in which the first and second messages reside in the dynamic priority queue.

After both of these items are put in dynamic queue 10, it appears as shown in FIG. 5. A single item is now retrieved from the priority queue. At the time of the "get," a list of priorities has been given to priority queue to allow retrieval of items according to specific priority(ies). The default behavior otherwise would be to get the earliest (oldest) item from the main queue, which results in first in, first out (FIFO) behavior. The list format used for this example is "Property=Value, Property=Value, . . . ." In this format, items with the given property values are returned in the order specified. Also, property names (without values) can be listed, so that any items with a given property can also be returned earlier than those without a given property. Consider what happens given the following priority lists.

For the list "TYPE=B" item #2 (message 28) is returned. The property queue TYPE is searched for a message with key #2 equal to B. A message with unique ID 2 as key #1 is returned. The message with that ID in main queue 12 is retrieved. All other messages with the given unique ID are removed from the property queues, and the item is then returned to the caller.

For the list "TYPE=C, SIZE=LARGE" item #1 (message 20) is returned. The property queue TYPE is searched for messages with key #2 equal to C. No message is returned. The property queue SIZE is searched for a message with key #2 equal to LARGE. A message with unique ID 1 as key #1 is returned. The message with that ID in main queue 12 is retrieved. All other messages with the given unique ID are removed from the property queues, and the item is then returned to the caller.

For the list "TIMEZONE, SIZE=SMALL" item #1 (message 20) is returned. The property queue TIMEZONE is requested to return the next message. A message with unique ID 1 as key #1 is returned. The message with that ID in main queue 12 is retrieved. All other messages with the given unique ID are removed from the property queues, and the item is then returned to the caller.

For the list "TIMEZONE=PST, SIZE=SMALL" item #2 (message 28) is returned. The property queue TIMEZONE is searched for messages with key #2 equal to PST. No message is returned. The property queue SIZE is searched for a message with key #2 equal to SMALL. A message with unique ID 2 is returned. The message with that ID in main queue 12 is retrieved. All other messages with the given unique ID are removed from the property queues, and the item is then returned to the caller.

For the list "TYPE=C, SIZE=MEDIUM" item #1 (message 20) is returned. The property queue TYPE is searched for messages with key #2 equal to C. No message is returned. The property queue SIZE is searched for messages with key #2 equal to MEDIUM. No message is returned. Main queue 12 is requested to return the first available message (default FIFO). The message with unique ID 1 is returned, and then returned to the caller. All other messages with the given unique ID are removed from the property queues.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of queuing messages for communications between computer programs, comprising the steps of:

placing a plurality of messages in a main queue, wherein each message has a message body and a message header;

placing one or more property messages in one or more property queues associated with the main queue, wherein each property queue has an associated property name and each property message contains a zero-byte property message body and a property message header;

for each property message, specifying within the property message header at least one property value of a respective message in the main queue and a unique identifier for the respective message;

searching one or more property queues according to predefined priority list, wherein the predefined priority list indicates a priority for property names and property values; and retrieving at least one message from the main queue that is associated with the unique identifier specified in a property message identified in the step of searching.

2. The method of claim 1 wherein said specifying step specifies a property name for the respective message.

3. The method of claim 1 wherein said placing steps are performed using an application program interface (API) which makes the main queue and the one or more property queues appear as a single priority queue.

4. The method of claim 1 wherein:

each property message is a zero-byte message having first and second keys; and said specifying step specifies the at least one property as the first key, and specifies the unique identifier as the second key.

5. The method of claim 1 wherein:

a plurality of property queues are associated with the main queue; and said specifying step specifies, for at least one property message, a number of properties which is less than the number of property queues.

6. The method of claim 1 comprising the further step of retrieving at least one message from the main queue according to a predefined priority list which includes the at least one property.

7. The method of claim 6 wherein said retrieving step retrieves the message from the main queue according to a predefined priority list which includes at least one property name.

8. The method of claim 6 wherein said retrieving step retrieves the message from the main queue according to a predefined priority list which includes at least one property value.

9. The method of claim 6 comprising the further step of dynamically modifying the priority list.

10. The method of claim 6 wherein said placing steps are performed by a first computer connected to a network, said retrieving step is performed by a second computer connected to the network, and further comprising the step of transmitting the plurality of messages across the network.

11. A computer program product comprising:

a storage medium; and program instructions stored on said storage medium for:

placing a plurality of messages in a main queue, wherein each message has a message body a message header;

placing one or more property messages in one or more property queues associated with the main queue, wherein each property queue has an associated property name and each property message contains a zero-byte property message body and a property message header;

for each property message, specifying within the property message header at least one property value of a respective message in the main queue and a unique identifier for the respective message;

searching one or more property queues according to predefined priority list, wherein the predefined priority list indicates a priority for property names and property values; and retrieving at least one message from the main queue that is associated with the unique identifier specified in a property message identified in the step of searching.

12. The computer program product of claim 11 wherein said program instructions specify a property name for the respective message.

13. The computer program product of claim 11 wherein said program instructions include an application program interface (API) which makes the main queue and the one or more property queues appear as a single priority queue.

14. The computer program product of claim 13 wherein the single priority queue is a one-to-one queue.

15. The computer program product of claim 11 wherein:

each property message is a zero-byte message having first and second keys; and said program instructions specify the at least one property as the first key, and specify the unique identifier as the second key.

16. The computer program product of claim 11 wherein:

a plurality of property queues are associated with the main queue; and said program instructions specify, for at least one property message, a number of properties which is less than the number of property queues.

17. The computer program product of claim 11 wherein said program instructions are further for retrieving at least one message from the main queue according to a predefined priority list which includes the at least one property.

18. The computer program product of claim 17 wherein said program instructions retrieve the message from the main queue according to a predefined priority list which includes at least one property name.

19. The computer program product of claim 17 wherein said program instructions retrieve the message from the main queue according to a predefined priority list which includes at least one property value.

20. The computer program product of claim 17 wherein said program instructions allow for dynamic modification of the priority list.

* * * * *